United States Patent
Chen

(10) Patent No.: US 8,540,008 B2
(45) Date of Patent: Sep. 24, 2013

(54) LIFT GUIDING SYSTEM FOR A CAR CURTAIN

(76) Inventor: Ing-Wen Chen, Hsinchu (TW)

( * ) Notice: Subject to any disclaimer, the term of this patent is extended or adjusted under 35 U.S.C. 154(b) by 0 days.

(21) Appl. No.: 13/396,082

(22) Filed: Feb. 14, 2012

(65) Prior Publication Data

US 2013/0206344 A1    Aug. 15, 2013

(51) Int. Cl.
*B60J 3/02*    (2006.01)
(52) U.S. Cl.
USPC ..................................... 160/370.22; 160/274
(58) Field of Classification Search
USPC ........... 160/370.22, 274, 265, 347; 296/97.8; 16/87.6 R, 87.8
See application file for complete search history.

(56) References Cited

U.S. PATENT DOCUMENTS

| | | | | |
|---|---|---|---|---|
| 2,320,003 A * | 5/1943 | Madan | ............................ | 16/87.8 |
| 3,279,528 A * | 10/1966 | Gambon et al. | ............... | 160/274 |
| 6,848,493 B1 * | 2/2005 | Hansen et al. | ........... | 160/370.22 |
| 6,968,887 B2 * | 11/2005 | Hansen et al. | ........... | 160/370.22 |
| 6,983,786 B2 * | 1/2006 | Chen | ......................... | 160/370.22 |
| 7,014,243 B2 * | 3/2006 | Nakajo | ........................ | 296/97.4 |
| 7,188,659 B2 * | 3/2007 | Hansen et al. | ........... | 160/370.22 |
| 2006/0237152 A1 * | 10/2006 | Hansen et al. | ........... | 160/370.22 |

* cited by examiner

*Primary Examiner* — David Purol
(74) *Attorney, Agent, or Firm* — Pro-Techtor Int'l Services

(57) ABSTRACT

A lift guiding system for a car curtain, set on the left and right hand sides of a car rear windshield, comprises a gliding rail in strip shape, wherein remote from the rear window a cover is set; a passage, an opening, a slide, longitudinally movable set in said passage, wherein an upper end is jointed with an end of the rod of said curtain; and a rope, wherein a lower end is connected with the folding system of the car curtain; while the upper end is fixed on said slide; thus the rope is concealed; due to the cover the outward appearance and interior trim become unified; so a aesthetic appearance is achieved.

1 Claim, 6 Drawing Sheets

US 8,540,008 B2

LIFT GUIDING SYSTEM FOR A CAR CURTAIN

FIELD OF THE INVENTION

The present invention relates to a lift guiding system for a car curtain, particularly to a lift guiding system for a car curtain for an aesthetic appearance and an easy assembly.

BACKGROUND OF THE INVENTION

As shown in FIG. 6, the "Height adjustable car curtain" published in U.S. Pat. No. 6,983,786 comprises at least an accommodating groove 20 at the bottom of a windshield, having a tubular shape with an upper opening 22; a car curtain 10, which is foldable in said accommodating groove 20 and extends through the upper opening 22, for covering the windshield; a rod 11 connected with the car curtain 10 at the top thereof for stretching the car curtain 10; two gliding rails 40a in strip shape set respectively on the left and right hand side of the windshield; two slides 63a, which at the bottom are movably set on the two gliding rails 40a, and at the top respectively jointed with both ends of the rod 11; and a folding system 30, wherein a rope connected with the slides pulls the rod and control unfolding and folding of the car curtain.

This patent is applied for covering a rear windshield, wherein the folding system is driven by electrical power. If raising is hindered, the car curtain returns automaticaly. The gliding rails fit into all types of car windows by suitable cutting and bending, without being tangled up with cords.

Still, there are disadvantages that ask for improvement as follows.

1. If the gliding rails 40a are bent for all types of car, the visible ropes (not shown) can impair the aesthetical appearance.

2. Although not looking abrupt after assembly due to strip shapes, the gliding rails 40a are not unified with the interior trim, so aesthetical appearance is impaired.

3. For stabilizing the structure, a spring 71a is plugged in the gap of the interior trim at the top of the gliding rail 40a. However, that is strenuous for a normal user, furthermore it is possible to destroy the interior trim.

SUMMARY OF THE INVENTION

The main object of the present invention is to provide a lift guiding system for a car curtain, wherein rope is concealed.

For achieving above object the present invention comprises a gliding rail in strip shape, having a longitudinal passage and an opening, wherein the passage connects an accommodating groove at the bottom and a roller is set at the top; a slide which comprises a clipping part, being longitudinally movable in the passage and having three longitudinal holes, wherein the first hole is set near the opening part of the slide, the second and third holes are successively remote from the first one; a connecting part, wherein a lower end is fixed on the clipping part and an upper end protrudes horizontally from the opening part of the slide; a jointing part, wherein a lower end is fixed at the top of the connecting part, an upper end protrudes upward and jointed on one end of the rod; and a rope, wherein a lower end is connected with a folding system and an upper end enters the lower end of the passage of the gliding rail, firstly passes through the third hole of the clipping part, then passes by the roller, then passes through the second hole at the top, then passes through the first hole at the bottom and is fixed there; and the rope is set in the third hole remote from the opening part of the gliding rail, so that the rope is concealed.

The other object of the present invention is to provide a lift guiding system for a car curtain, wherein an outward appearance is unified with the interior trim for an aesthetical appearance.

For achieving above object the present invention comprises a cover set on said gliding rail according to destined shape covering the interior trim, for getting an unified of outward appearance and the interior trim, so an aesthetical appearance is achieved.

Another object of the present invention is to provide a lift guiding system for a car curtain, which is easily assembled on the interior trim.

For achieving above object, the present invention comprises a holding part in a C-shaped section for connecting a positioning component, wherein the positioning component comprises a positioning part in a T-shaped section and a clamping part in a U-shaped section; the positioning part is movable for fixing on the holding part of the gliding rail; while the clamping part is clamping on an edge of the interior trim for fixing the gliding rail on the interior trim; so an easy assembly is achieved.

Other aspects and advantages of the present invention will become apparent from the following detailed description, taken in conjunction with the accompanying drawings, illustrating by way of example the principles of the present invention.

DESCRIPTION OF THE PREFERRED EMBODIMENTS

Figure 1:
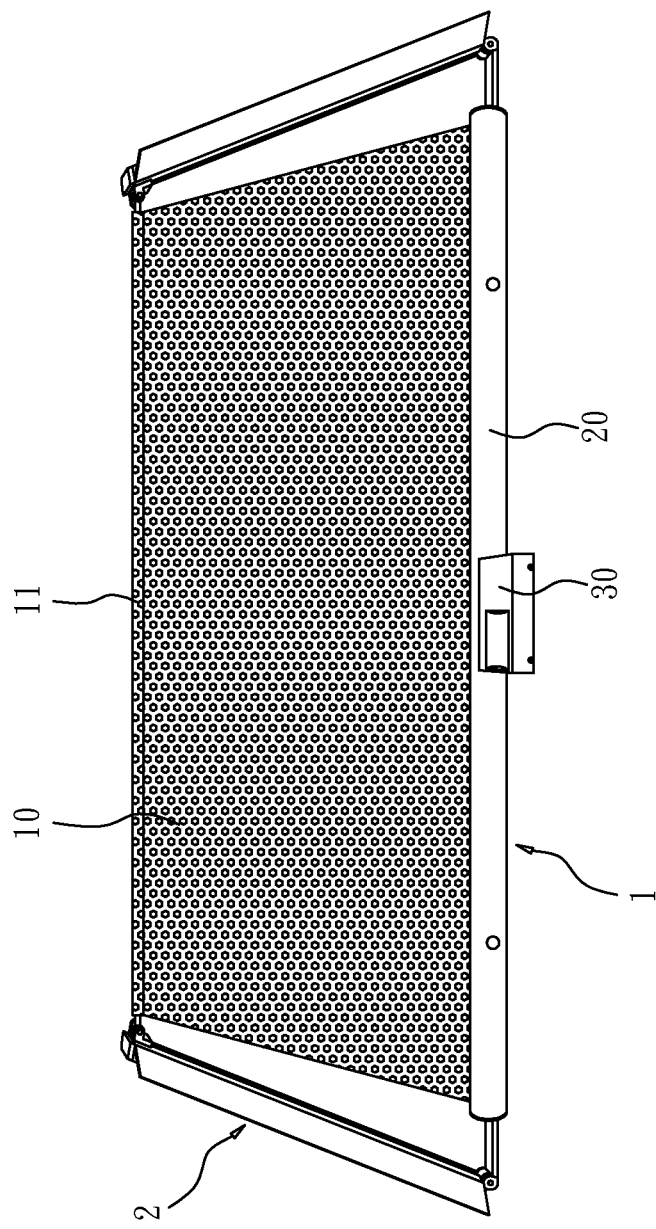
FIG. 1 is a perspective view of the lift guiding system of the present invention applied to a car curtain.
Figure 3:
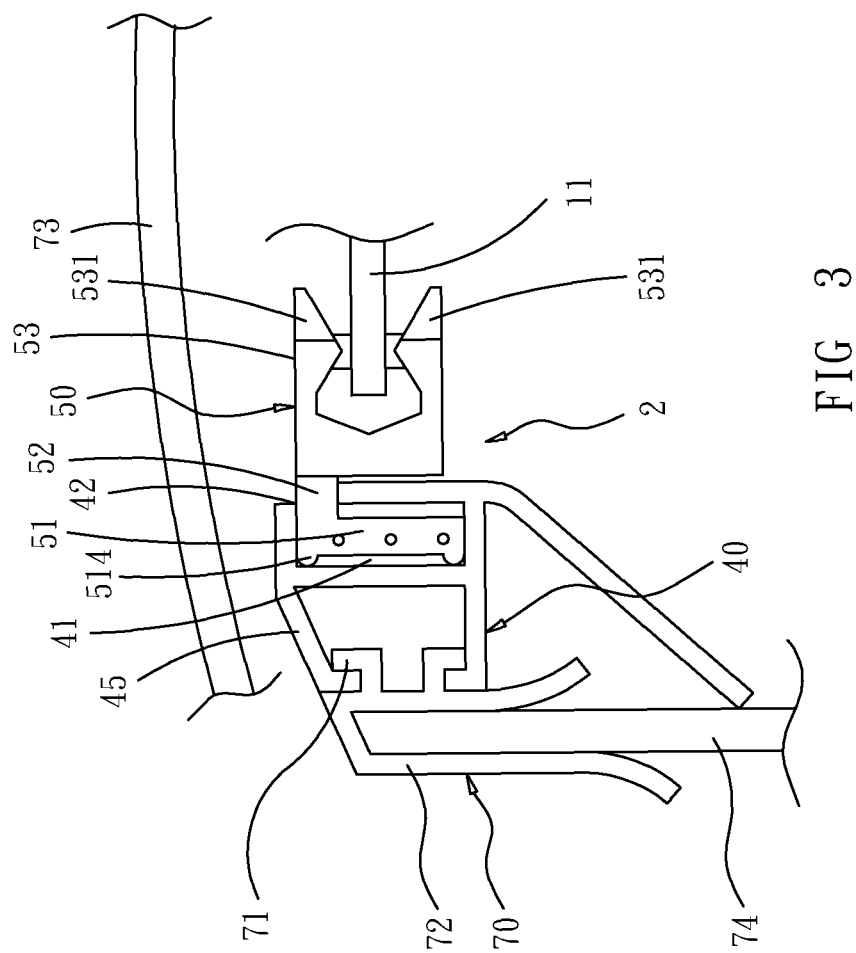
FIG. 3 is a top view of the present invention.

As shown in FIG. 1 and FIG. 3, the lift guiding system for a car curtain 2 of the present invention is set respectively on the left and right hand side of the rear windshield 73 of car. The curtain system 1 combined with the present invention is conventional technology, which is here not described.

Figure 2:
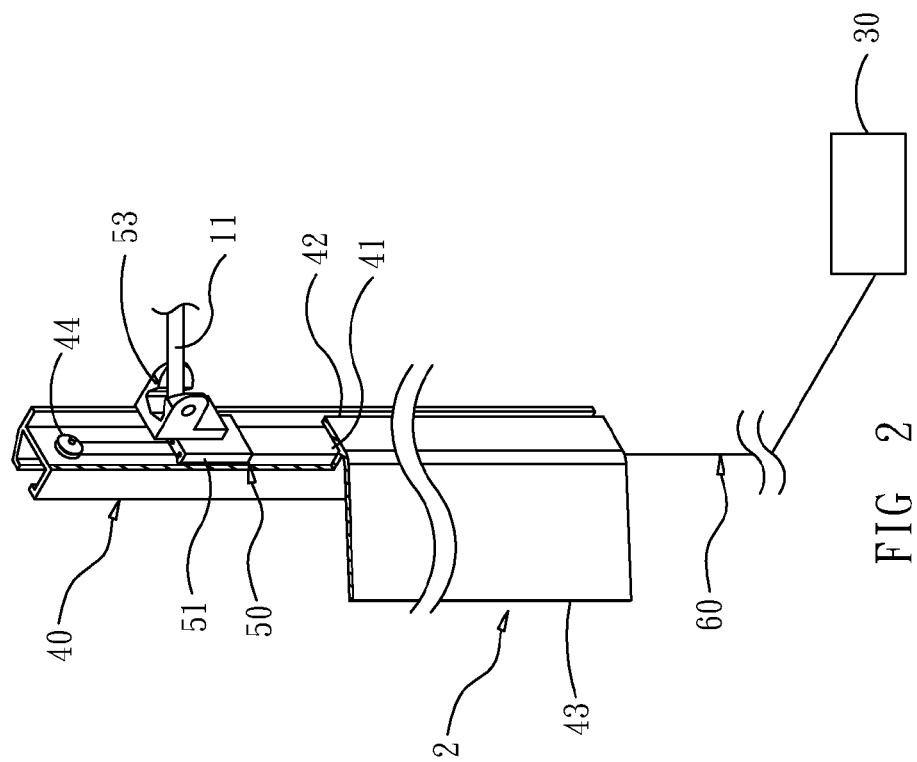
FIG. 2 is a partial perspective view of a part of said gliding rail of the present invention.

As shown in FIG. 2, the present invention relates to a part of said gliding rail, wherein a folding system 30, as shown in a box, is a conventional technology and is here not described. The lift guiding system for a car curtain 2 of the present invention comprises: a gliding rail 40 in strip shape, having a longitudinal passage 41, which has an opening part 42 at the top near the windshield, while, remote from the window, a cover 43 stretches out and covers the interior trim according to a destined shape, for unifying the outward appearance with the interior trim. So an aesthetical appearance is achieved. The passage at the bottom is connected with an accommodating groove, in which a roller 44 is set at the top; a slide 50 containing a clipping part 51, which is longitudinally movable and set in said passage 41; a connecting part 52 (as shown in FIG. 3), wherein a lower end is fixed on said clipping part 51, an upper end is protruded horizontally from said opening part 42 of the gliding rail; a jointing part 53, wherein a lower end is fixed on the upper end of said connecting part 52 and an upper end is protruded upward for jointing on one end of said rod 11; and a rope 60, wherein a lower end is connected with a folding system and an upper end is entering in said passage 41 of the gliding rail at bottom, passing by said roller 44, then fixed on said clipping part 51, so that the rope is concealed.

Figure 4:
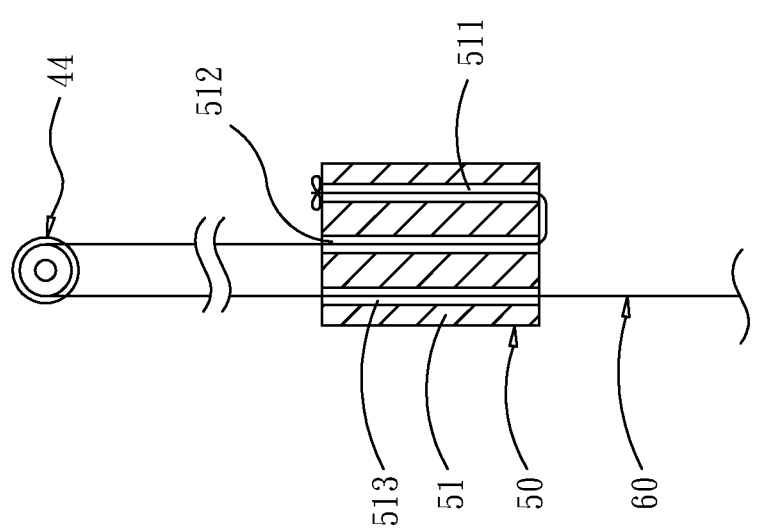
FIG. 4 shows the assembly of slide and rope of the present invention.

FIG. 3~4 show the assembly of the slide and the rope of the present invention. The clipping part 51 of the slide 50 has three longitudinal holes, wherein the first hole 511 is set near said opening part 42 of the gliding rail, the second hole 512, the third hole 513 are successively remote from the first hole 511; wherein the upper part of said rope 60 entering in said passage of the gliding rail is a movable part, which drives said slide 50 moving in said passage 41; after entering in said passage 41, firstly passing through the third hole 513, then passing by said roller 44, then passing through the top of the second hole 512, then passing through the first hole 511 at the bottom, it is fixed on the first hole 511; the setting of the moving part of the rope is remote from the third hole 513 of the opening part 42 of the gliding rail, so the rope is concealed.

As shown in FIG. 3, outward the slide rail 40 a holding part 45 in a C-shaped section is set for connecting a positioning component 70.

The positioning component 70 is consisted of a positioning part 71 in a T-shaped section and a clamping part 72 in a U-shaped section connecting at the rear of said positioning part 71; wherein the positioning part 71 is movable for fixing on the holding part 45 of the gliding rail; since the clamping part 72 is clamped on the edge of the interior trim 74, the gliding rail 40 is fixed on the interior trim 74. So an easy assembly is achieved.

As the gliding rail 40 is a standard equipment of a car, it can be fixed on the interior trim with screws or other established ways (not shown in FIG.).

The gliding rail 40 is made of flexible material in a destined shape for fitting into all types of interior trim.

As shown in FIG. 3, at the bottom of the clipping part 51 there are several projections 514 for reducing fiction between it and said passage 41 of the gliding rail.

Figure 5:
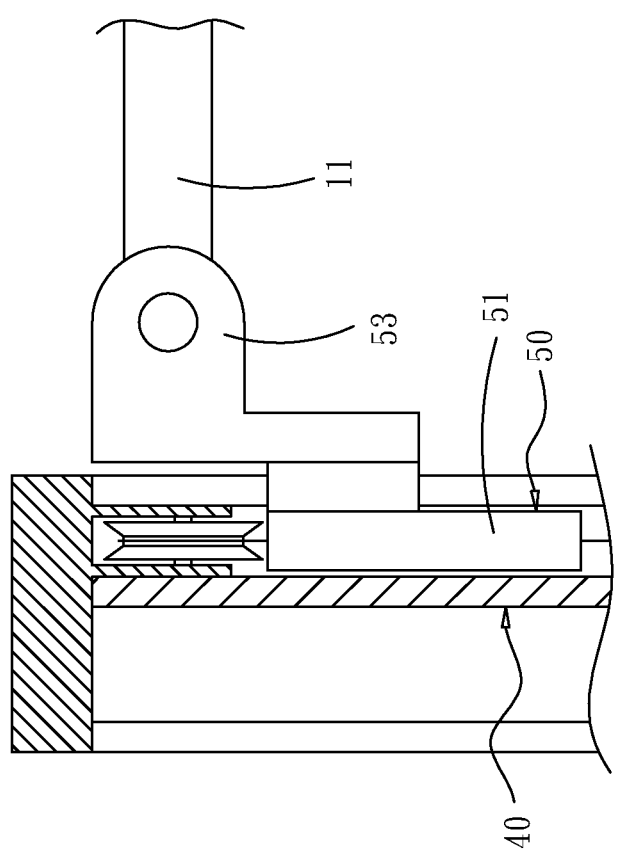
FIG. 5 is a local section of the present invention, wherein the slide is moving to the top of the gliding rail.
Figure 6:
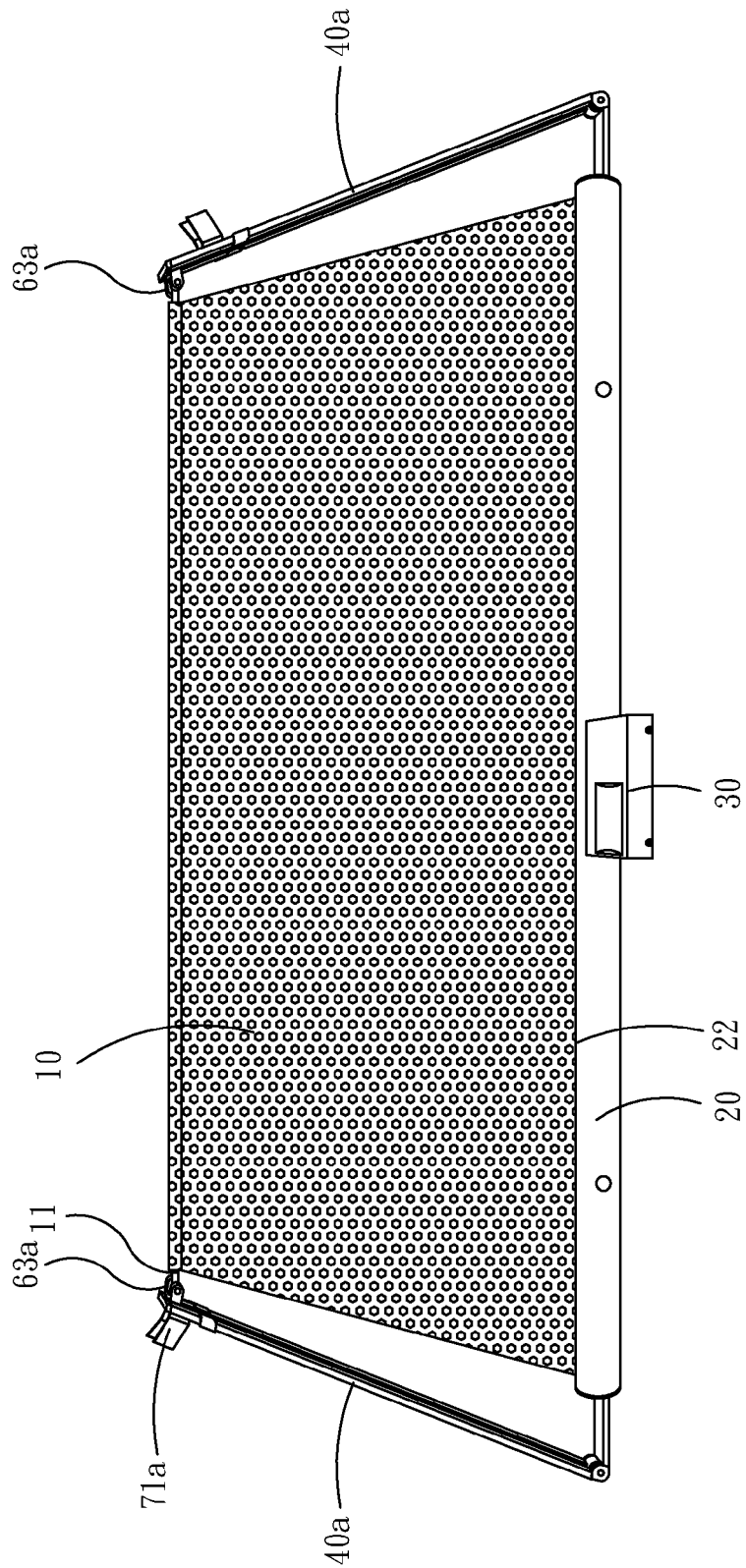
FIG. 6 is a perspective view of prior art.

FIG. 5 is a local section, wherein the slide is moving to the top of the gliding rail. The top of the jointing part 53 is heigher than said clipping part 51, so the end point of the raising path of said rod 11 jointed on the jointing part 53 is higher than said clipping part 51, even higher than the top of the gliding ail (if necessary), for complete covering of the windshield.

As shown in FIG. 3, the jointing part 53 comprises two ear parts 531, which are jointed with an end of the rod 11 by a pivot.

The invention claimed is:

1. A lift guiding system for a car curtain, set respectively on the left and right hand side of the rear windshield of a car, applying to a curtainset, wherein said curtain set comprises:
    an accommodating groove, having a tubular shape at the bottom of the windshield;
    a curtain, being foldable in said accommodating groove and extending through an opening of said accommodating groove for covering said windshield;
    a rod, connecting with said curtain at the top for stretching said curtain; and
    a folding system, for controlling unfolding and folding of the car curtain;
    wherein said car curtain lift guiding system comprises:
    a gliding rail in strip shape having a longitudinal passage, wherein at the top of said passage near the windshield there is an opening part, while remote from the windshield a cover extending outward for covering the interior trim; on the lower end said passage is connected with said accommodate groove, while on the upper end a roller is set; and
    a slide, further comprising:
    a clipping part, being longitudinally movable in said passage;
    a connecting part, on the lower end being fixed on said clipping part, while on the upper end horizontally extending through said opening part;
    a jointing part, on the lower end being fixed on said connecting part, while on the upper end extending for jointing said rod; and
    a rope, on the lower end connecting with said folding system, while on the upper end entering in said passage of the gliding rail at the bottom, passing by said roller, and then being fixed on said clipping part;
    wherein the clipping part of said slide has three longitudinal holes, the first hole being set near said opening part of the gliding rail, and the second hole and the third hole being disposed successively remote from said first hole; and
    said rope after entering in said passage of the gliding rail, firstly passing through the third hole at the bottom, then bypassing said roller, then passing through said second hole at the top, then entering in said first hole at the bottom, and fixed on said first hole.

\* \* \* \* \*